Dec. 29, 1931.  W. SHURTLEFF  1,838,504
HEATING AND VENTILATING SYSTEM
Filed Jan. 31, 1931
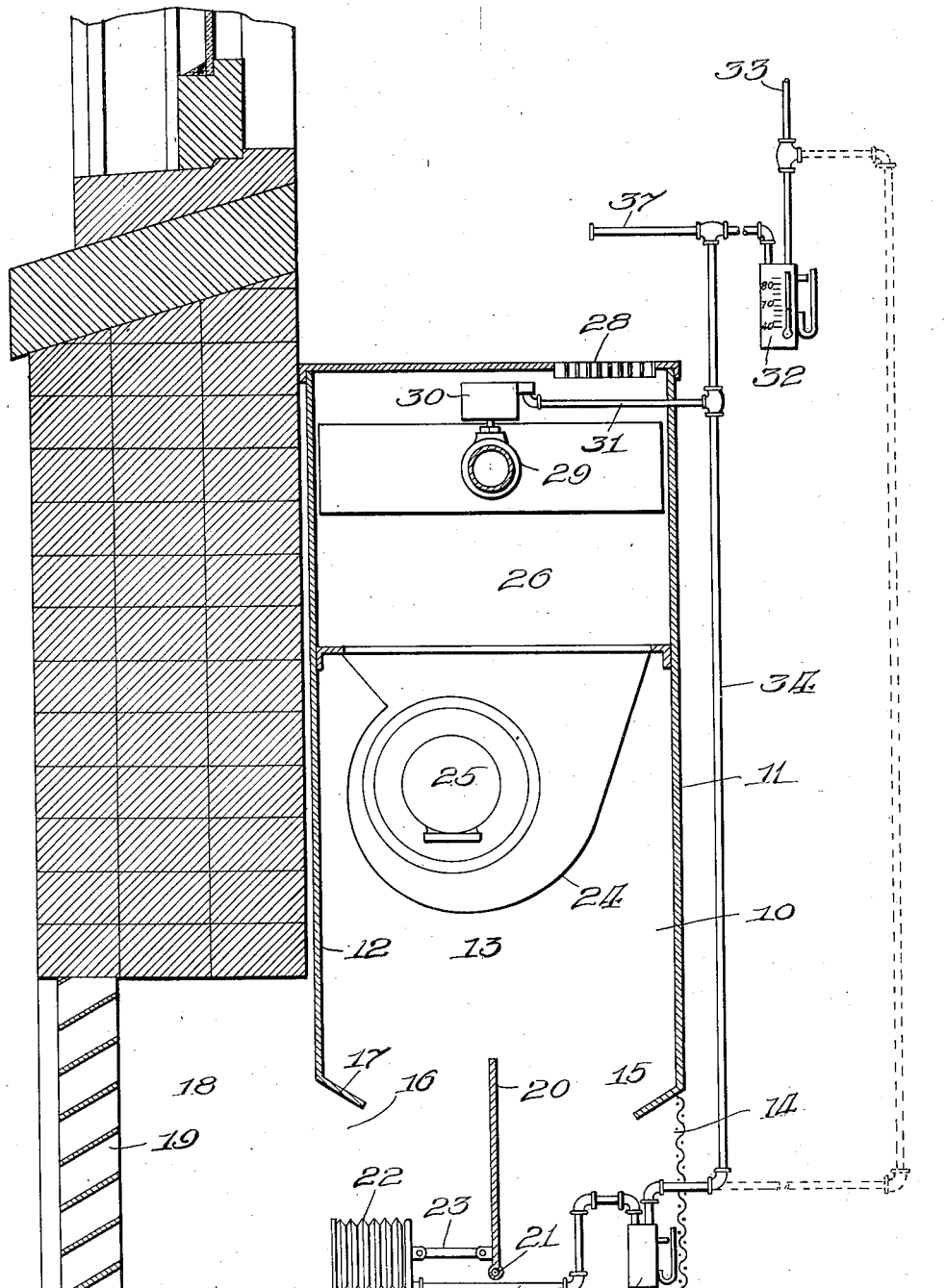

Patented Dec. 29, 1931

1,838,504

UNITED STATES PATENT OFFICE

WILFRED SHURTLEFF, OF MOLINE, ILLINOIS, ASSIGNOR TO THE HERMAN NELSON CORPORATION, OF MOLINE, ILLINOIS, A CORPORATION OF ILLINOIS

HEATING AND VENTILATING SYSTEM

Application filed January 31, 1931. Serial No. 512,564.

This invention relates to heating and ventilating systems.

The present invention relates particularly to the means provided for regulating the air intakes and for preventing back drafts into the room when the external air intake is opened to admit outdoor air under conditions which require a cooling of the room temperature to maintain it in comfortable condition.

The heating and ventilating system of the present invention employs a unit heater and ventilator which is adapted to re-circulate indoor air and heat the same when required, until the room temperature has been elevated to the desired degree, and thereafter to cut off the supply of heating medium to the unit radiator, and if necessary to admit outdoor air from time to time to prevent overheating. These operations are controlled by thermostatic means located and operated with especial reference to the requirements of the present invention.

During cold weather, when artificial heat is required, there is a strong tendency for the air in a room to stratify, with the result that the air at about the five-foot level from the floor known as the breathing line, will invariably be warmer than the air at the floor, with the result that a thermostatic control maintained solely at the five-foot level will afford no assurance that comfortable temperatures will be maintained at the floor level, by reason of the stratification of the air.

The present invention overcomes the difficulty noted, by providing a thermostat at the high or wall level adapted to control the supply of heating medium to the radiator and working in conjunction with a second thermostat located at or near the floor level and adapted to control the damper for regulating the admission of outdoor air, the two thermostats under one method being operated in series, so that it will be impossible to admit outdoor air during the period or interval while artificial heating is maintained, thus tending to conserve heat units and at the same time prevent the admission of additional outdoor air under room conditions which would tend to augment and increase the difficulties in control resulting from air stratification.

One of the principal objects of the present invention is to prevent discharge of sub-freezing outdoor air at the floor level when wind pressure overcomes the suction of the fan, by utilizing the tendency towards stratification and draft effects on the floor to effect the control of the damper which regulates the inflow of cold air.

Another important result resides in the fact that by the means employed, it is possible to maintain a constant volume of outdoor air received into the room through the heating and ventilating unit, despite the effect of wind pressure to increase the air volume admitted at a given setting of the damper.

Another object of the invention is to eliminate the danger from "thermostat hunting" or suddenly drawing cold air in at a time when heating is required, by so regulating the damper that it will open or close in response to thermostatic control at or near the floor level rather than under the influence of distantly located thermostatic control.

Another object of the invention is to utilize the full range of controlled air pressure from naught to twelve or fifteen pounds to afford intermediate adjustments of the valves and dampers independently and in proper sequential order which eliminates the danger of overheating in operations due to a lag in the action of the thermostats, and a failure to operate effectively within a restricted range of temperature changes, although the present invention is designed to reduce the range of temperatures required to operate the valves and dampers in step by step sequence, to a minimum, without complicating the piping of the units.

Another object of the invention is to permit the heating of a room to indicate a higher temperature in cold weather than that maintained or reduced to in warm weather, without readjustment of the thermostats, by using the variable stratification effects set up under cold weather conditions to control the action of the thermostats.

Further objects and details of the invention will appear from the description thereof in conjunction with the accompanying drawing, which is a diagrammatic view showing the interior of a heating and ventilating unit thermostatically controlled in accordance with the principles of the present invention.

The apparatus of the present invention may be variously operated in accordance with variable settings of the respective thermostats to meet various or special air conditions, but before referring in detail to the several methods of operation, it is deemed proper to describe the system as a whole and as illustrated in the drawing.

The system comprises a unit heater and ventilator 10, having a front wall 11, a rear wall 12, and end walls 13. The interior arrangement of the heating and ventilating unit is modified in various ways to provide for the inlet of air either from the room or from an exterior source, and to provide for the heating and discharge of the air into the room.

In the present embodiment of the invention, which serves merely for purposes of illustration, the front wall of the housing is provided near its base with a recirculation air inlet 14 provided along its upper margin with an obliquely disposed inwardly extending flange 15. Exterior air is admitted through an exterior air inlet 16 having an oblique flange 17.

The air inlet 16 communicates with a fresh air duct 18 extending through the exterior wall of a building and guarded at its intake by louvers 19. Between the flanges 15 and 17 is located a flap valve 20 which is pivoted at its base 21 and actuated by means of a motor 22 which is connected with the flap valve by a link 23.

Air admitted to the interior of the housing, either from the room or from outdoors, or from both sources of supply, is draw into a fan 24 operated by a motor 25 and discharged upwardly into a heating chamber 26, in which is located a light weight high efficiency radiator 27 preferably of non-ferrous highly conducting metal and having a large radiating surface in proportion to its volume, as is customary according to the present practice in the construction of heating and ventilating units of the character here in question. The air is ultimately discharged through an upwardly directed air discharge outlet 28.

A heating medium, usually steam, is supplied to the radiator through a supply pipe 29, which is controlled by a compressed air valve motor 30 which is actuated by compressed air admitted through a pipe 31 leading to what may be termed the upper thermostat 32 which controls the admission of pressure to the valve line 31.

The thermostat is connected with an air pressure main 33, and the line 31 has leading therefrom a branch line 34 which supplies compressed air to a thermostat 35 located in or near the recirculation air inlet located at or near the floor level. The thermostat 35 may be termed the lower thermostat and serves to control the supply of air pressure through the pipe line 36 to the damper motor 22.

If desired, the air line 31 controlled by the upper thermostat may be extended to provide a supply pipe 37 leading to the control valve of a direct radiator, where it is desired to employ direct radiation in conjunction with the heating and ventilating afforded by a unit of the character involved in the present invention.

The apparatus shown permits the room temperature to be controlled in various ways, depending upon the setting of the respective thermostats, so that a considerable range of adjustment is possible to adapt the mechanism to operate most effectively under varying conditions which will be hereinafter explained more in detail.

As shown, the compressed air admitted through the pressure main 33 must pass the upper thermostat in order to establish conditions which permit of the operation either of the steam supply valve or the damper, and by regulating the air valve motor and the damper motor to operate at different air pressures, and by also regulating the respective thermostats, it is obvious that a proper sequential order may be maintained in the operation of the respective devices. Thus, by a proper adjustment, the steam valve motor may be set to operate at a lower pressure than the damper motor, so that the supply of heating medium will always be cut off in advance of the operation of the damper motor to swing the damper inwardly to permit the entrance of exterior air from outdoors.

By operating these two instrumentalities from the same source of air supply and under a control established from the wall thermostat, supplemented by a special thermostatic control of the damper from the floor level, it is quite evident that the shutting off of the steam and the subsequent admission of exterior cold air will be deferred until the temperature at the breathing line has risen to a predetermined degree, as, for instance, 70° F.

In like manner, upon the lowering of the room temperature at the breathing line, or a sudden ingress of an excessive amount of cold air at the floor level, the sequence of operations will be reversed and the damper will be closed against the admission of outdoor air before the steam valve is opened, while during a considerable period the damper will be maintained in an intermediate position and circulate a mixture of indoor and outdoor air while the steam supply is shut off and under the special control of the floor level thermostat, which in these conditions will at such times be provided with an adequate supply of pressure to permit it to control the damper in response to local variations in temperature at the floor level, and irrespective of the stability of temperatures at the breathing line.

This method of supplemental control at the floor level is of primary importance in cold weather conditions which result in indoor stratification, since it permits of the controlled ingress of outdoor air in the volume required to prevent overheating of the room due to body heat of the occupants or from other uncontrollable causes, without subjecting the occupants to the dangers of sudden drafts along the floor and at a level which would not immediately, if at all, affect the operation of the wall thermostat. At the same time, even under stable exterior temperatures, an excessive admission of outdoor, air, under wind pressure, will be prevented by the action of the floor thermostat in response to back drafts driven into the room through the re-circulation air inlet under wind pressure and counter to the suction of the fan, which under normal conditions will maintain an inward circulation through the indoor air intake when the damper stands in an intermediate position. In this way, under conditions which normally require the admission of a limited volume of outdoor air, a control will be maintained against the admission of an excess volume, so that room conditions will be stabilized, and the tendency towards stratification will be overcome by the maintenance of a constant re-circulation of indoor air and a proper dissemination of a limited volume of outdoor air commingled therewith by the action of the fan.

This tendency towards stratification is noticable only under cold air conditions, in which the difference between indoor and exterior temperatures is extreme, and under which conditions it is desirable to maintain the temperature at the breathing line at a higher level than is desirable in warmer spring or summer weather, during which the differential in temperature between exterior and interior air is slight, and in which there is no substantial tendency toward stratification.

Subject to the above general observations, the mechanism may be adjusted to operate in conformity with any one of the following described methods.

*The first method.*—In conformity with the first method, an intermediate or positive and relay acting upper thermostat is set for close one degree range, and springs in the valve operating motors are set to close one direct radiator valve at three pounds air pressure and the unit radiator valve at from six to eleven pounds air pressure.

The lower thermostat in the indoor air inlet is set to begin operating the damper to open for the admission of outdoor air at eight pounds spring pressure and to complete the operation at twelve pounds spring pressure.

This action against variable pressure of from eight to twelve pounds places the operation of the damper under the direct control of the lower thermostat at the floor level, so that for variable pressures within this range the damper will occupy an intermediate position and circulate both indoor and outdoor air, responding promptly, however, to a sudden abnormal ingress of cold outdoor air and establishing a proper damper adjustment which will reduce or cut off the further ingress of outdoor air until stable conditions are re-established.

It is preferred, in conformity with the first method, to set the lower thermostat to act for a very close range of one degree and to set it at the same or at one degree higher temperature than the upper thermostat, although the operating temperature of the lower or floor thermostat may be set slightly below or above that of the upper thermostat, with a modification in the results attendant thereon.

*Second method.*—This method is devised to meet conditions where a constant supply of fresh air is desired during the occupancy of the room. By setting the floor thermostat approximately four degrees below the upper or wall thermostat, a re-circulation of indoor air is maintained while the heat is on in the morning and before the room temperature has been elevated to a comfortable degree, and by the change in air stratification the damper may automatically shift to take in outside air at about the time the room temperature has been elevated to the comfort point. If the steam fails or is allowed to cool down at night, the damper will automatically shift to close the exterior inlet and to maintain the re-circulating position to prevent waste of heat.

In order to operate the device in conformity with the second method, the air supply to the lower or floor thermostat must be led directly from the air pressure main 33, as indicated in the dotted line, so that the floor thermostat operates independently of any control exercised by the upper or wall thermostat, which is required where it is desired to constantly admit fresh air to the room, even during the period of time while the supply of heating medium is admitted to the radiator.

The second method of control is peculiarly adapted for use in conjunction with unit heaters and ventilators of the type shown in the Otis Patent No. 1,493,497, of May 13, 1924, or others of a generally similar mechanical construction.

*Third method.*—The third method is adapted to furnish a constant supply of fresh air during mild weather only. By setting the adjustment of the floor thermostat about two degrees below the setting of the wall thermostat, the unit ventilator will re-circulate indoor air while heating up the room, and also whenever the outside temperature is as low as ten degrees below freezing, which effects a considerable saving in fuel. This is due to the fact that with a low outdoor temperature, the floor thermostat will operate the damper to close the ingress of outdoor air as soon as the floor temperature in the vicinity of the heating and ventilating unit is lowered to an extent greater than two degrees below the setting of the wall thermostat.

Under the third method, as well as under the second method, a wind pressure sufficient to overcome the suction of the fan in cold weather will tend to automatically restrict the air supply to the usual volume by cooling the floor thermostat and allowing the damper to partially restrict the supply of outdoor air.

In the case of the third method, the air supply to the floor thermostat must be taken direct from the air pressure main, since independence of the action of the two thermostats is required to secure the results indicated.

The third method of control is peculiarly adapted for use in conjunction with unit heaters and ventilators of the type shown in the Otis Patent No. 1,493,497, of May 13, 1924, or others of a generally similar mechanical construction.

*Fourth method.*—By setting the floor thermostat one or two degrees above the wall thermostat, the damper will be shifted to restrict re-circulation of indoor air and to admit a large volume or the entire volume of air from outdoors only when the room overheats to an extent of one or two degrees at the floor level, but in these circumstances the artificial heat may be shut off long before the admission of outdoor air, and the room will then be maintained in a comfortable temperature for an extended period of time merely by the re-circulating of indoor air, which distributes excess heat from the bodies of occupants and other sources of uncontrollable heat.

The fourth method is preferred where steam supply is erratic and the room heats slowly, and this method of control is particularly adapted for use in connection with unit heaters and ventilators of the type shown in the Otis Patent No. 1,753,157, of April 1, 1930.

*Fifth method.*—By placing the wall thermostat at a lower level than the breathing line, and approximately two feet above the floor, and by leaving the thermometer at the usual five-foot level, results in a condition in which the wall thermometer will indicate warm room conditions when the air is cooled outside, since stratification during extremely cold weather, and particularly in the mornings, causes the room temperature to stand at a higher degree at the five-foot level than at the two-foot level. During warm weather, the entire room at all levels stands at substantially even temperature, and the adjustment mentioned results in a warmer room in cold weather than in warm weather, which is a result much to be desired for comfort. By this method, an overheating of two degrees above normal in extremely cold weather is possible.

The present system, in its various modifications of method, is adapted for use in connection with various combinations of direct heating and unit heating, and even with a unit ventilator in which the radiator is omitted, but which serves to re-circulate indoor air and commingle outdoor air therewith, under thermostatic regulation of the direct radiators and the damper for controlling the flow of indoor and outdoor air.

With the floor thermostat in series with the wall thermostat, and even with a faulty adjustment, it is impossible to open the damper to outside air while the heat is being admitted to the radiator, because the damper motor must get the air pressure from the valve branch line, which automatically shuts off the supply of heating medium as the pressure builds up and before the floor thermostat can operate the damper motor. In other words, there is no air available to operate the damper motor until the heat is shut off.

With the present system, full twelve to fifteen pounds available air pressure range can be utilized for valve motor operation, and the same air can later be used for damper motor operation, cutting down the temperature range required to operate the respective thermostats to one degree for each, which permits of a wide range of intermediate adjustments, which is highly desirable in place of a sudden shifting of the mechanisms throughout the complete range of adjustment.

Hunting of the valve motor operating air line pressure, which is most pronounced in the cold mornings, is not transmitted to the damper control at this time, because the air surrounding the floor thermostat is too cold to allow the latter to open for the admission of air pressure to the damper motor, and by the time the room approaches a stage requiring the admission of outdoor air, the air pressure in the valve lines from thermostat hunting has settled down to a substantially steady operation.

Charts from recording pressure gauges over a long period of days indicate that there are violent fluctuations in the pressure of air delivered to the valve and damper motors by thermostats during the heating up morning period in school rooms using automatically controlled unit ventilators for heating and air circulation. Usually this hunting ceases somewhat later in the day when air temperatures become stabilized. These violent pressure fluctuations are caused by waves of heat and cooler air alternately coming into the vicinity of the thermostat, which results in alternate full opening and closing of valves and dampers, which tends to prolong the trouble.

The only previous remedy for the above conditions has been to increase the range of full operation of the thermostat. That is, to adjust it so that it requires from three degrees to four degrees variation in room temperature to build up full air pressure in the branch line to the air motors. This remedy is faulty because it means that the room may be held at 70° in cold weather and 74° in warm weather, which is contrary to comfort requirements.

The present method allows of cutting the operating range of the thermostats to very close limits, even to one degree or less, and sometimes make the air fluctuations so rapid that the steam pressure may not build up or escape in the radiators as fast as the thermostat changes. The result is a gradual variation in the artificial heat output up or down as needed.

The floor thermostat protects the damper motor from the effects of any air pressure fluctuations until the outdoor weather is warm enough to allow the room to retain a comfortable temperature without artificial heat. When the floor air temperature is evened up to that of the five-foot level, the floor thermostat is ready to open the damper to admit mildly cool outside air.

The present invention is one which admits of numerous modifications in detail in order to best adapt the system to local conditions, but in all cases the use of two thermostats, provided respectively for the control of the heating supply and for the regulation of the air supply, under the influence of temperatures at different levels within the room, permits of the establishment and maintenance of safe and comfortable conditions, which are practically impossible of attainment where the entire control of the system is thermostatically regulated from the breathing line.

I claim:

1. The method of heating and ventilating which consists in regulating the supply of heating medium to a room in conformity with temperature conditions existing at a relatively high level and in controlling the re-circulation of indoor air and the admission of outdoor air in conformity with room temperatures at a relatively low level.

2. The method of heating and ventilating which consists in regulating the supply of heating medium to a room in conformity with temperature conditions existing at a relatively high level and in controlling the re-circulation of indoor air and the admission of outdoor air in conformity with room temperatures at a relatively low level the control of the heating medium and the air being so inter-related as to permit ingress of outdoor air only after the supply of heating medium has been shut off.

3. The method of heating and ventilating which consists in controlling the heating of a room conformably to temperature conditions at substantially the breathing line level and in controlling the re-circulation of indoor air and the admission of outdoor air conformably to temperature conditions at a point near the floor level and in proximity to the point of back draft admission of outdoor air.

4. The method of heating and ventilating which consists in controlling the heating of a room conformably to temperature conditions at substantially the breathing line level and in controlling the re-circulation of indoor air and the admission of outdoor air conformably to temperature conditions at a point near the floor level and in proximity to the point of back draft admission of outdoor air the control of the heating medium and the air being so inter-related as to permit ingress of outdoor air only after the supply of heating medium has been shut off.

5. The method of heating and ventilating which consists in controlling the admission of heating medium to a room to be conditioned in conformity with a predetermined temperature at substantially the level of the breathing line, and in controlling the re-circulation of indoor air and the admission of outdoor air responsively to a different temperature at substantially the floor level.

6. The method of heating and ventilating which consists in controlling the admission of heating medium to a room to be conditioned in conformity with a predetermined temperature at substantially the level of the breathing line, and in controlling the re-circulation of indoor air and the admission of outdoor air responsively to a different lower temperature at substantially the floor level.

7. The method of heating and ventilating which consists in controlling the admission of heating medium to a room to be conditioned in conformity with a predetermined temperature at substantially the level of the breathing line, and in controlling the re-circulation of indoor air and the admission of outdoor air responsively to a different temperature at substantially the floor level and in proximity to the point of back draft admission of outdoor air.

8. The method of heating and ventilating which consists in controlling the admission of heating medium to a room to be conditioned in conformity with a predetermined temperature at substantially the level of the breathing line, and in controlling the re-circulation of indoor air and the admission of outdoor air responsively to a different lower temperature at substantially the floor level and in proximity to the point of back draft admission of outdoor air.

9. In an apparatus of the character described, the combination of a heating and ventilating unit, comprising a housing having an inlet for re-circulation of indoor air, an inlet for the admission of outdoor air, and damper means for controlling said inlets, and having an air discharge outlet and a fan and radiator within the housing, actuating devices for said damper means, means for regulating the supply of heating medium to the radiator, a thermostat for controlling the action of said heat regulating means, and a thermostat for controlling the operation of the damper actuating devices, the respective thermostats being located in separated relation to one another and in positions to act responsively to different thermal conditions.

10. In an apparatus of the character described, the combination of a heating and ventilating unit, comprising a housing having an inlet for re-circulation of indoor air, an inlet for the admission of outdoor air, and damper means for controlling said inlets, and having an air discharge outlet and a fan and radiator within the housing, actuating devices for said damper means, means for regulating the supply of heating medium to the radiator, a thermostat for controlling the action of said heat regulating means, and a thermostat for controlling the operation of the damper actuating devices, the thermostat for operating the heat regulating means being located at a relatively high level, and the thermostat for controlling the operation of the damper actuating devices being located at a relatively low level.

11. In an apparatus of the character described, the combination of a heating and ventilating unit, comprising a housing having an inlet for re-circulation of indoor air, an inlet for the admission of outdoor air, and damper means for controlling said inlets, and having an air discharge outlet and a fan and radiator within the housing, actuating devices for said damper means, means for regulating the supply of heating medium to the radiator, a thermostat for controlling the action of said heat regulating means, and a thermostat for controlling the operation of the damper actuating devices, the thermostat for controlling the action of the heat regulating means being located at substantially the breathing line, and the thermostat for controlling the action of the damper actuating devices being located at the level of the indoor and outdoor air inlets.

12. In an apparatus of the character described, the combination of a heating and ventilating unit, comprising a housing having an inlet for re-circulation of indoor air, an inlet for the admission of outdoor air, and damper means for controlling said inlets, and having an air discharge outlet and a fan and radiator within the housing, actuating devices for said damper means, means for regulating the supply of heating medium to the radiator, a thermostat for controlling the action of said heat regulating means, and a thermostat for controlling the operation of the damper actuating devices, the respective thermostats being located in separated relation to one another and in positions to act responsively to different thermal conditions, and means for supplying an actuating fluid to the damper actuating thermostat, said fluid supplying means being controlled by the actuation of the high level thermostat.

13. In an apparatus of the character described, the combination of a heating and ventilating unit, comprising a housing having an inlet for re-circulation of indoor air, an inlet for the admission of outdoor air, and damper means for controlling said inlets, and having an air discharge outlet and a fan and radiator within the housing, actuating devices for said damper means, means for regulating the supply of heating medium to the radiator, a thermostat for controlling the action of said heat regulating means, and a thermostat for controlling the operation of the damper actuating devices, the thermostat for operating the heat regulating means being located at a relatively high level, and the thermostat for controlling the operation of the damper actuating devices being located at a relatively low level, and means for supplying an actuating fluid to the damper actuating thermostat, said fluid supplying means being controlled by the actuation of the high level thermostat.

14. In an apparatus of the character described, the combination of a heating and ventilating unit, comprising a housing having an inlet for re-circulation of indoor air, an outlet for the admission of outdoor air, and damper means for controlling said inlets, and having an air discharge outlet and a fan and radiator within the housing, actuating devices for said damper means, means for regulating the supply of heating medium to the radiator, a thermostat for controlling the action of said heat regulating means, and a thermostat for controlling the operation of the damper actuating devices, the thermostat for controlling the action of the heat regulating means being located at substantially the breathing line, and the thermostat for controlling the action of the damper actuating devices being located at the level of the indoor and outdoor air inlets, and means for supplying an actuating fluid to the damper actuating thermostat, said fluid supplying means being controlled by the actuation of the high level thermostat.

15. In an apparatus of the character described, the combination of a housing provided with an indoor air inlet and an outdoor air inlet, and damper means for regulating said inlets, and further provided with an air discharge outlet to the room to be conditioned, and a fan for maintaining circulation of air through one or both of said inlets and discharging the same through said outlet, a radiator, a wall thermostat and connections located at a high level and adapted to control the supply of heating medium to said radiator, and a floor thermostat and connections located at a relatively low level and adapted to control the operation of the damper means.

16. In an apparatus of the character described, the combination of a housing provided with an indoor air inlet and an outdoor air inlet, and damper means for regulating said inlets, and further provided with an air discharge outlet to the room to be conditioned, and a fan for maintaining circulation of air through one or both of said inlets and discharging the same through said outlet, a radiator, a wall thermostat and connections located at a high level and adapted to control the supply of heating medium to said radiator, and a floor thermostat and connections located at a relatively low level and adapted to control the operation of the damper means, and means for supplying actuating fluid to the floor thermostat, said fluid supplying means being controlled by the action of the wall thermostat.

17. In an apparatus of the character described, the combination of a unit located in the room to be conditioned and provided near its base with an indoor air re-circulating inlet and an outdoor air inlet, and provided in its top with an upwardly directed air discharge outlet, a damper adapted to be regulated to admit air from either one or both of the air inlets, a fan and a radiator within the housing, a fluid actuated motor for operating the damper to either of its extreme positions or an intermediate position, a fluid actuated valve motor for controlling the supply of heating medium to the radiator, pipe lines for supplying fluid pressure to each of said motors, a thermostat located at a high level and responsive to temperatures at said level for controlling the supply of fluid to the valve actuating motor, and a thermostat located at a low level and responsive to temperatures at that level for controlling the supply of fluid pressure to the damper actuating motor.

18. In an apparatus of the character described, the combination of a unit located in the room to be conditioned and provided near its base with an indoor air re-circulating inlet and an outdoor air inlet, and provided in its top with an upwardly directed air discharge outlet, a damper adapted to be regulated to admit air from either one or both of the air inlets, a fan and a radiator within the housing, a fluid actuated motor for operating the damper to either of its extreme positions or an intermediate position, a fluid actuated motor for controlling the supply of heating medium to the radiator, pipe lines for supplying fluid pressure to each of said motors, a thermostat located at a high level and responsive to temperatures at said level for controlling the supply of fluid to the valve actuated motor, and a thermostat located at a low level and responsive to temperatures at that level for controlling the supply of fluid pressure to the damper actuating motor, the last mentioned thermostat being interposed in the pipe lines controlled by the first mentioned thermostat.

19. In an apparatus of the character described, the combination of a unit located in the room to be conditioned and provided near its base with an indoor air re-circulating inlet and an outdoor air inlet, and provided in its top with an upwardly directed air discharge outlet, a damper adapted to be regulated to admit air from either one or both of the air inlets, a fan and a radiator within the housing, a fluid actuated motor for operating the damper to either of its extreme positions or an intermediate position, a fluid actuated valve motor for controlling the supply of heating medium to the radiator, pipe lines for supplying fluid pressure to each of said motors, a thermostat located at a high level and responsive to temperatures at said level for controlling the supply of fluid to the valve actuated motor, a thermostat located within the line of air flow through the indoor air inlet and responsive to temperatures at that point for controlling the supply of fluid pressure to the damper actuated motor.

20. In an apparatus of the character described, the combination of a unit located in the room to be conditioned and provided near its base with an indoor air re-circulating inlet and an outdoor air inlet, and provided in its top with an upwardly directed air discharge outlet, a damper adapted to be regulated to admit air from either one or both of the said inlets, a fan and a radiator within the housing, a fluid actuated motor for operating the damper to either of its extreme positions or an intermediate position, a fluid actuated valve motor for controlling the supply of heating medium to the radiator, pipe lines for supplying fluid pressure to each of said motors, a thermostat located at a high level and responsive to temperatures at said level for controlling the supply of fluid to the valve actuated motor, a thermostat located within the line of air flow through the indoor air inlet and responsive to temperatures at that point for controlling the supply of fluid pressure to the damper actuated motor, the last mentioned thermostat being interposed in the pipe lines controlled by the first mentioned thermostat.

WILFRED SHURTLEFF.